Figure 7:
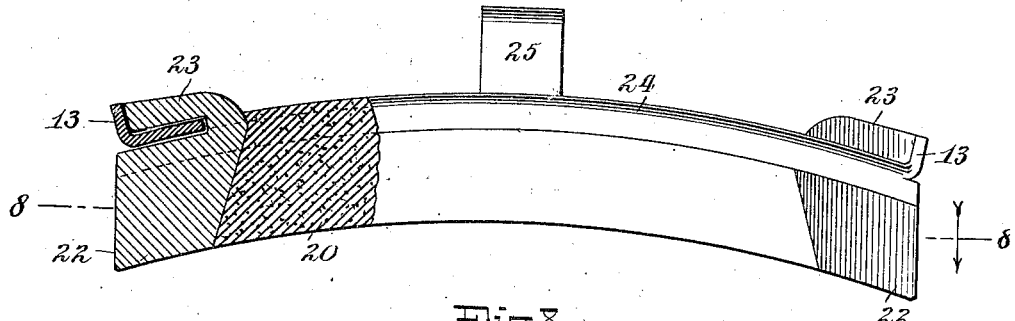

H. JONES.
COMPOSITION FILLED BRAKE SHOE.
APPLICATION FILED MAY 10, 1913.
1,074,366.
Patented Sept. 30, 1913.
3 SHEETS—SHEET 1.
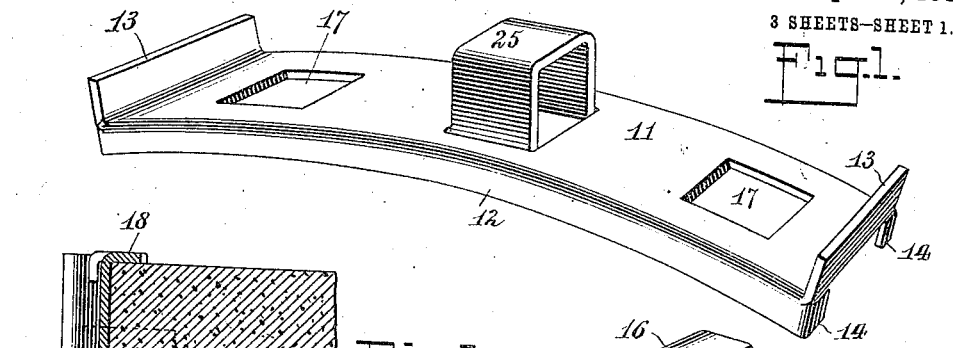
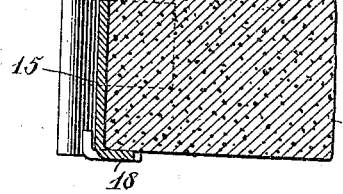
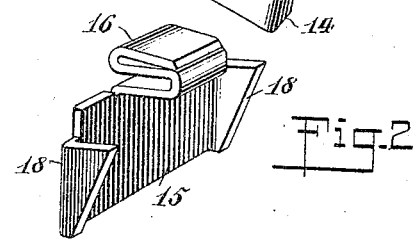
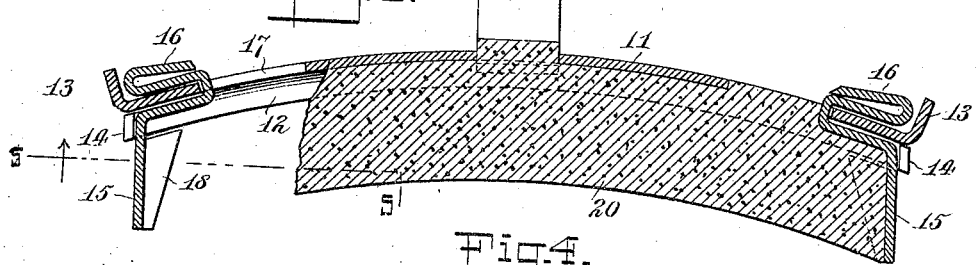
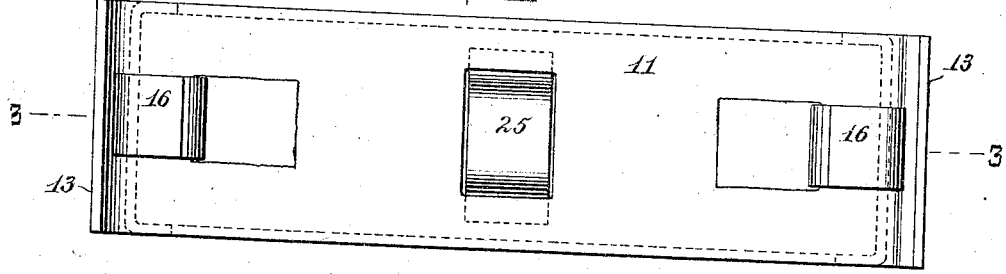
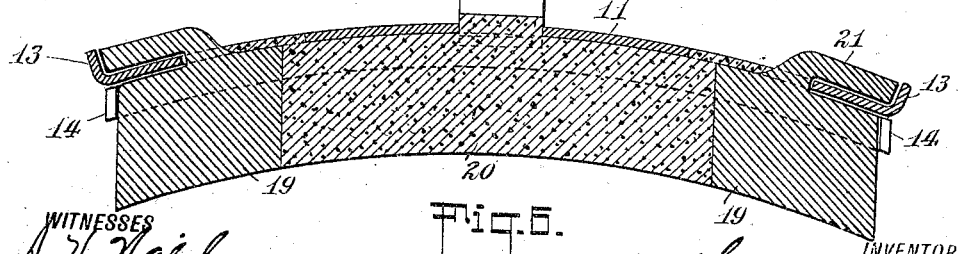

H. JONES.
COMPOSITION FILLED BRAKE SHOE.
APPLICATION FILED MAY 10, 1913.

1,074,366.

Patented Sept. 30, 1913.

3 SHEETS—SHEET 2.

WITNESSES
A. J. Walsh
R. N. Trhut

INVENTOR
Harry Jones
BY George Berk
ATTORNEY

H. JONES.
COMPOSITION FILLED BRAKE SHOE.
APPLICATION FILED MAY 10, 1913.
1,074,366.
Patented Sept. 30, 1913.
3 SHEETS—SHEET 3.
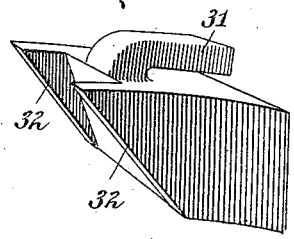
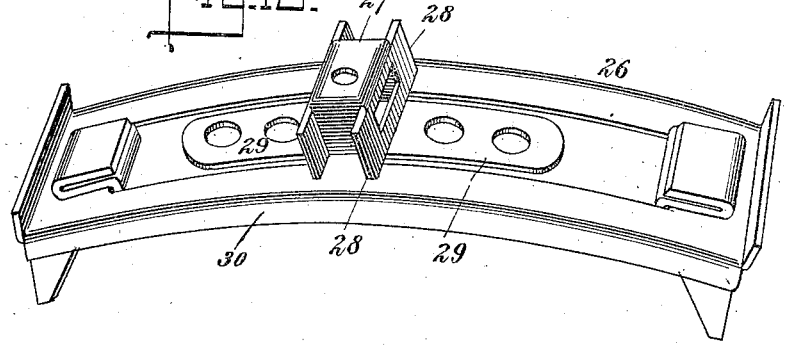
WITNESSES:
INVENTOR
Harry Jones
BY George Cook
ATTORNEY

UNITED STATES PATENT OFFICE.

HARRY JONES, OF SUFFERN, NEW YORK, ASSIGNOR TO AMERICAN BRAKE SHOE & FOUNDRY COMPANY, OF MAHWAH, NEW JERSEY, A CORPORATION OF NEW JERSEY.

COMPOSITION-FILLED BRAKE-SHOE.

1,074,366.  Specification of Letters Patent.  Patented Sept. 30, 1913.

Application filed May 10, 1913. Serial No. 766,683.

*To all whom it may concern:*

Be it known that I, HARRY JONES, a citizen of the United States, and a resident of Suffern, in the county of Rockland and State of New York, have made and invented certain new and useful Improvements in Composition-Filled Brake-Shoes, of which the following is a specification.

My invention relates to an improvement in brake shoes, and more particularly to that type or style thereof commonly known and referred to as a composition or filled shoe. Brake shoes of this type require a casing, shell or other support, of a form appropriate to hold the composition or body material in order to prevent the latter from breaking or crumbling while the shoe is in use, or during transportation. This supporting member, usually designed more particularly for the purpose of holding the body material rather than to assist in any way in the frictional qualities of the shoe, is usually made in the form of a shell, either being cast in that form, or pressed or stamped up from sheet metal, the ends, sides and top being usually made integral or in one piece. In the shell is contained the frictional material, preferably a composition, which, contacting with the tread of the wheel, gradually wears away while the shoe is in service. As the sides and ends also contact with the tread of the wheel, they wear away with the body material until such time as the shoe becomes too thin or fragile for further use.
The back of the shoe, usually made integral with the sides and ends, with the remaining portion of the body material, is then scrapped or discarded as unfit for further use or service, this scrap, comprising largely the metal back, entailing a severe loss.

The object of my invention is to so construct the back that the scrapping thereof may be avoided, the several parts being so constructed and arranged that the partially worn ends may be removed, and new ones substituted therefor, the back itself being saved and utilized by adding thereto new ends, and a new body of composition or frictional material.

A further object of my invention is to provide a brake shoe of the type above referred to, in which ends, or end blocks, of any desired size, form, area, or material, may be secured or attached to the supporting back, to thereby provide for varying the character of the wearing face of the shoe, it being understood that the end blocks and composition are worn away simultaneously, and that the free ends of the block form a part of the wearing face of the shoe.

With the above and other ends in view, the invention consists in the improved composition or filled brake shoe illustrated in the accompanying drawing, and hereinafter described and claimed, and in such variations and modifications thereof as will be obvious to those skilled in the art to which my invention relates.

Figure 8:
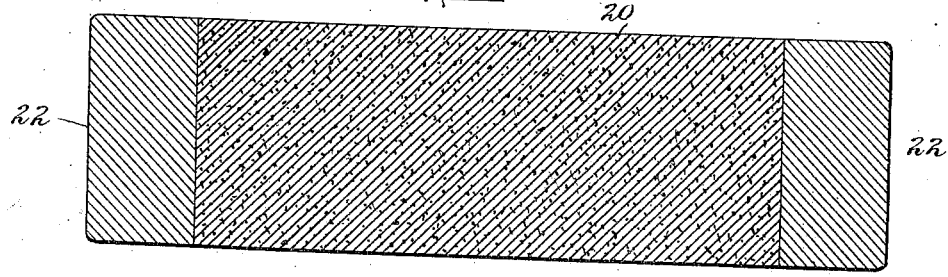
Figure 9:
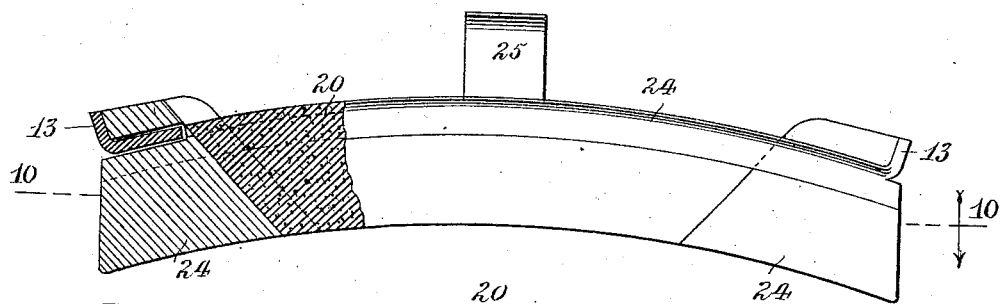
Figure 10:
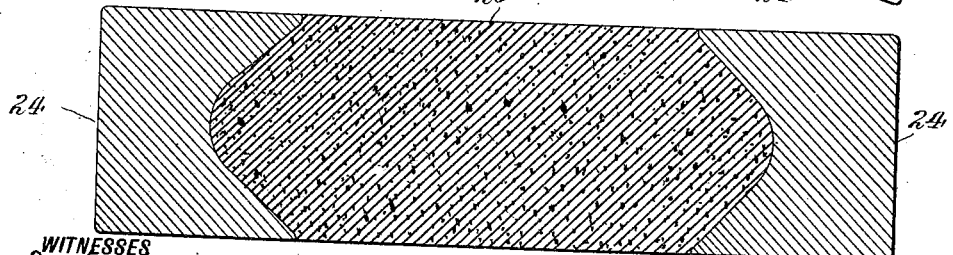

In the accompanying drawings, Figure 1 is a view in perspective of a brake shoe back, which may be utilized in connection with my invention, the detachable ends being removed. Fig. 2 is a view in perspective of one of the detachable ends. Fig. 3 is a sectional view taken upon the line 3—3 of Fig. 4, a portion of the body material being removed. Fig. 4 is a top plan view of a back having the detachable end secured thereto. Fig. 5 is a sectional view taken on the line 5—5 of Fig. 3. Fig. 6 is a longitudinal sectional view of a shoe employing a modified form of detachable end. Fig. 7 is a side view of a brake shoe constructed in accordance with my invention, and partly in section and partly in elevation, and illustrating another form of detachable end. Fig. 8 is a sectional view taken on the line 8—8 of Fig. 7, looking in the direction of the arrow. Fig. 9 is a similar view to that illustrated in Fig. 7, showing still another form of detachable end. Fig. 10 is a sectional view taken on the line 10—10 of Fig. 9, looking in the direction as indicated by the arrow. Fig. 11 is a view in perspective of one form of detachable end, and Fig. 12 a view in perspective of a brake shoe back, employing detachable ends, and a modified form of key lug.

Referring to the drawings, the reference numeral 11 designates a supporting back shown as formed from a blank, cut from a plate of wrought iron or mild steel, say from about one-eighth to three-sixteenths inch in thickness, and bent and shaped, by means of a suitable press, to provide two longitudinally extending side flanges 12, two upwardly extending end stops 13, and inwardly extending lugs 14, although the particular shape or form, the material, and structural features of the supporting back, are not involved in my invention, broadly considered.

Detachably secured to the supporting back 11 are the ends 15, preferably extending to the wearing face of the finished shoe, and attached to the back by means of a hook 16 provided upon each end or block, and which hook extends through a hole or opening 17 provided in the back and along the upper side thereof toward the end stop 13, the hook being somewhat narrower than the back to form guide lugs adapted to be assembled with a standard form of head.

Figs. 2 to 5 of the drawing show the ends or blocks 15, and hooks 16, as formed from a metal blank, by suitable bending and shaping operations, the hook being in the form of a loop to thereby increase the height of the guide lug formed by it, although it will of course be understood that the ends or blocks, including the hook, may be formed from cast metal. These ends or blocks, formed as above described, are preferably provided with side wings or flanges 18, to assist in holding the body material or composition in place upon the back 11, as hereinafter described.

The body 20 of the shoe is made of a composition filling, preferably non-metallic or semi-metallic, and pressed on and anchored to the steel back 11, while the composition is in a plastic condition, this body material being contained within the side flanges 18 of the detachable ends 15.

The back 11 is provided also with a lug 25, which, as illustrated in several of the figures of the drawings, may be made of a separate piece from the back 11, or integral therewith, as illustrated in Fig. 12, wherein the back is composed of the two sides 26 connected by the lug 27 provided with vertical transverse plates 28, the latter being continuous into the anchorage plates 29, the sides 26 being bent downwardly, to form the side flanges 30. It will be understood, however, that the lug may be made and assembled with the back in any suitable way, as such forms no part of my present invention.

It will be further understood that the removable ends may also assume different forms or shapes, as, for instance, in Fig. 6, these ends are shown in the form of metal blocks 19, preferably cast with hook 21 on the upper side thereof in order to engage with the back 11; or, if desired, these blocks may assume the shape as illustrated in Figs. 7 and 8, the inner walls of the block 22 being slightly beveled toward their outer ends, and provided with a hook 23 on the upper side thereof; or, as illustrated in Figs. 9 and 10, the blocks 24 may be somewhat recessed, or as illustrated in Fig. 11, may be provided with the wings 32, a hook 31 being cast on the upper side as in the former instances.

By thus varying the size and shape of the detachable ends, the length or area of the composition filling may also be increased or decreased as desired, whereby to control the frictional effect of the composition filling of which the body is made. In addition to the protection afforded by the ends to the body material of the shoe, they also lend to the finished shoe a composite wearing face, it being possible to cast these ends or blocks of hard or soft cast iron, or of mild steel, according to the nature of the material employed in the formation of the body of the shoe, the area of this cast metal block being increased or decreased as it may be desired to increase or decrease the length or the area of the composition filling forming the body, the intention being to apply to the steel back a metal end extending to the face of the shoe to protect the composition filling from being broken away in handling or while the shoe is in service, and also to give any desired proportion of metal in the wearing face of the shoe, to co-act with the composition filling to effect the desirable wearing and frictional surface for the shoe. This feature is particularly an advantageous one, in that the relative proportion of metal and filling may be varied in accordance with the use or service to which the shoe is to be subjected, as while one surface may require a large proportion of composition filling to give high friction, yet another surface may require a large proportion of cast metal in the wearing face of the shoe, as compared with the composition filling, to give a less amount of friction.

From the foregoing it will be understood that after the shoe has been worn down in service, including the detachable ends, the remaining portions of the filling may be removed or detached from the back, the ends or blocks also detached therefrom, leaving the steel back available for the attachment of new ends and for a new body; in other words, providing a structure which will enable the steel back to be used repeatedly, and thus overcoming the loss incurred by the scrapping thereof.

I wish it to be understood that I do not limit or restrict my present invention to the shape or contour of the back, to the type or style of attaching lug, nor to any particular structure of detachable end or block; nor to the particular composition of material employed in the formation of the body of the shoe, as all of these elements may be altered or varied as desired, in accordance with the use or service to which the shoe is to be put, but, on the contrary, intend to include herein any and all types or structures of shoes wherein is employed a reinforcing back provided with removable ends or blocks adapted to interlock with said back and to include in the term "removable ends or blocks" all structures which may be detachably secured in any position with the back for the purpose of retaining or assisting in retaining the body material in place upon the back and to avoid injury to said body during service or transportation.

What I claim is:—

1. An end piece for use with the back for a brake shoe and adapted to be locked to said back.

2. An end piece for use in connection with the back for a brake shoe and adapted to be detachably secured to said back.

3. An end piece for use in connection with the back for a brake shoe, said end piece being provided with means for locking the same to said back.

4. An end piece for use in connection with the back for a brake shoe, said end piece being provided with means for detachably securing the same to said back.

5. A back for a brake shoe provided with detachable ends.

6. A back for a brake shoe constructed with interlocking detachable ends.

7. A back for a brake shoe provided with detachable ends, said ends being formed with hooks to interlock with said back.

8. A back for a brake shoe provided with detachable ends, said ends being provided with hooks to interlock with said back and forming guide lugs.

9. A back for a brake shoe provided with detachable interlocking ends, said ends being formed with an integral hook and guide lugs projecting through said back.

10. In a brake shoe, a metallic supporting back; means whereby the shoe may be secured to a suitable support; metallic blocks separate from said back and detachably secured thereto, and which blocks extend to the wearing face of the shoe; and a mass of material supported by said back and filling the space between said blocks.

11. In a brake shoe, a metallic supporting back; means whereby the shoe may be secured to a suitable support; two detachable metallic blocks secured one at each end of said back and which blocks extend to the wearing face of the shoe; and a mass of material supported by said back and filling the space between said blocks.

12. In a brake shoe, a metallic supporting back; means whereby the shoe may be secured to a suitable support; two metallic blocks having each a hook portion adapted to engage said back, which blocks are located one at each end of said back and extend to the wearing face of the shoe; and a mass of material supported by said back and filling the space between said blocks.

13. In a brake shoe, a supporting back formed from sheet metal and having downwardly extending side flanges, and an upwardly extending end stop at each end; means whereby the shoe may be secured to a suitable support; two metallic blocks extending to the wearing face of the shoe and having each a hook portion adapted to extend through an opening provided in said back and along the upper side thereof, and which hook portions terminate adjacent said end stops; and a mass of material supported by said back and filling the space between said blocks.

14. In a brake shoe, a metallic supporting back; means whereby the shoe may be secured to a suitable support; metallic blocks detachably secured to said back and projecting toward the wearing face of the shoe; and a mass of material supported by said back and filling the space between said blocks.

15. In a brake shoe, a metallic supporting back; means whereby the shoe may be secured to a suitable support; two metallic blocks detachably secured to said back adjacent the ends thereof and which blocks project toward the wearing face of the shoe; and a mass of material supported by said back and fitting the space between said blocks.

16. In a brake shoe, a metallic supporting back; and two metallic blocks having each a hook portion adapted to engage said back and which blocks project toward the wearing face of the shoe.

17. In a brake shoe, a metallic supporting back having an opening; and a metallic block having a hook portion adapted to extend through said opening and along the upper surface of said back, and which block projects toward the wearing face of the shoe.

18. In a brake shoe, a metallic supporting back; and two metallic blocks detachably secured to said back adjacent the ends thereof and which blocks project toward the wearing face of the shoe.

Signed at Suffern, in the county of Rockland and State of New York this 8" day of May, A. D. 1913.

HARRY JONES.

Witnesses:
W. M. POTTER,
CHAS. C. MOORE.